(12) United States Patent
Fuji

(10) Patent No.: US 9,733,708 B2
(45) Date of Patent: Aug. 15, 2017

(54) ELECTRONIC DEVICE, OPERATION CONTROL METHOD, AND OPERATION CONTROL PROGRAM

(75) Inventor: Masateru Fuji, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/009,655

(22) PCT Filed: Apr. 6, 2012

(86) PCT No.: PCT/JP2012/059583
§ 371 (c)(1),
(2), (4) Date: Oct. 3, 2013

(87) PCT Pub. No.: WO2012/137946
PCT Pub. Date: Oct. 11, 2012

(65) Prior Publication Data
US 2014/0024414 A1    Jan. 23, 2014

(30) Foreign Application Priority Data
Apr. 6, 2011  (JP) ................................ 2011-084790

(51) Int. Cl.
G06F 3/041    (2006.01)
G06F 3/01     (2006.01)
G06F 3/0488   (2013.01)

(52) U.S. Cl.
CPC .......... *G06F 3/016* (2013.01); *G06F 3/04886* (2013.01)

(58) Field of Classification Search
CPC ........ G06F 3/016; G06F 3/04886; G06F 3/01; G06F 3/041; G06F 2203/04105;
(Continued)

(56) References Cited

U.S. PATENT DOCUMENTS 7,657,849 B2    2/2010    Chaudhri et al.
8,046,721 B2    10/2011   Chaudhri et al.
(Continued)

FOREIGN PATENT DOCUMENTS

JP    2000-137576 A    5/2000
JP    2000-222129 A    8/2000
(Continued)

OTHER PUBLICATIONS

International Search Report and Written Opinion corresponding to PCT/JP2012/059583, dated Jul. 10, 2012.
(Continued)

*Primary Examiner* — Kathy Wang-Hurst
*Assistant Examiner* — B. M. M Hannan
(74) *Attorney, Agent, or Firm* — Hauptman Ham, LLP

(57) ABSTRACT

According to an aspect, an electronic device includes: a display unit; a detection unit for detecting contact with the display unit; a vibration unit for vibrating the detection unit; and a control unit for switching between a first state where a predetermined process is not performed based on an operation by contact with the display unit and a second state where the predetermined process is performed based on the operation by contact with the display unit. When the detection unit detects contact at a predetermined position on the display unit in the first state, the control unit causes the vibration unit to vibrate the detection unit based on the contact, and switches from the first state to the second state.

12 Claims, 10 Drawing Sheets

(58) Field of Classification Search
CPC ...... G06F 3/042; G06F 3/0416; G06F 3/0488;
G06F 3/04883; G06F 3/044; G06F 3/045;
G06F 3/0412; G06F 3/046; G09G 5/00;
G09B 21/0011; G09B 21/002; G09B
21/003
USPC ................ 455/566; 345/168–173, 175, 156;
715/207, 210, 273, 761, 828
See application file for complete search history.

(56) References Cited

U.S. PATENT DOCUMENTS

| | | | |
|---|---|---|---|
| 8,209,637 B2 | 6/2012 | Chaudhri et al. | |
| 8,286,103 B2 | 10/2012 | Chaudhri et al. | |
| 8,527,903 B2 | 9/2013 | Chaudhri et al. | |
| 8,627,237 B2 | 1/2014 | Chaudhri et al. | |
| 8,640,057 B2 | 1/2014 | Chaudhri et al. | |
| 8,694,923 B2 | 4/2014 | Chaudhri et al. | |
| 8,745,544 B2 | 6/2014 | Chaudhri et al. | |
| 8,760,422 B2 | 6/2014 | Ikeda | |
| 2002/0149561 A1* | 10/2002 | Fukumoto et al. | 345/156 |
| 2005/0054390 A1* | 3/2005 | Tuovinen | B06B 1/0215 455/575.1 |
| 2006/0181520 A1* | 8/2006 | Ikegawa | 345/173 |
| 2007/0080951 A1* | 4/2007 | Maruyama | G06F 1/1626 345/173 |
| 2008/0150905 A1* | 6/2008 | Grivna | G06F 3/016 345/173 |
| 2009/0140996 A1* | 6/2009 | Takashima | G06F 1/1626 345/173 |
| 2009/0322695 A1* | 12/2009 | Cho | G06F 3/0416 345/173 |
| 2010/0099394 A1 | 4/2010 | Hainzl | |
| 2010/0141410 A1* | 6/2010 | Aono | G06F 3/016 340/407.2 |
| 2010/0214239 A1* | 8/2010 | Wu | G06F 3/016 345/173 |
| 2010/0238116 A1* | 9/2010 | Shin | 345/168 |
| 2010/0238129 A1 | 9/2010 | Nakanishi et al. | |
| 2010/0253652 A1* | 10/2010 | Homma et al. | 345/177 |
| 2010/0271322 A1* | 10/2010 | Kondoh et al. | 345/173 |
| 2010/0317410 A1* | 12/2010 | Song | G06F 3/04886 455/566 |
| 2011/0050653 A1* | 3/2011 | Miyazawa et al. | 345/179 |
| 2011/0080367 A1* | 4/2011 | Marchand et al. | 345/174 |
| 2011/0102358 A1* | 5/2011 | Aono et al. | 345/173 |
| 2011/0134061 A1* | 6/2011 | Lim | G06F 3/016 345/173 |
| 2011/0248930 A1* | 10/2011 | Kwok | G06F 3/016 345/173 |
| 2011/0285517 A1* | 11/2011 | Lam | G06F 3/016 340/407.2 |
| 2011/0291976 A1* | 12/2011 | Takada | G06F 3/016 345/173 |
| 2012/0113061 A1* | 5/2012 | Ikeda | 345/175 |
| 2012/0127107 A1 | 5/2012 | Miyashita et al. | |
| 2012/0154329 A1 | 6/2012 | Shinozaki | |
| 2012/0188178 A1* | 7/2012 | Hamada | 345/173 |
| 2012/0242584 A1* | 9/2012 | Tuli | G06F 3/016 345/173 |
| 2015/0082252 A1 | 3/2015 | Chaudhri et al. | |

FOREIGN PATENT DOCUMENTS

| | | |
|---|---|---|
| JP | 2002-149312 A | 5/2002 |
| JP | 2007-115157 A | 5/2007 |
| JP | 2008-191086 A | 8/2008 |
| JP | 2009-009412 A | 1/2009 |
| JP | 2009-521753 A | 6/2009 |
| JP | 2010-224658 A | 10/2010 |
| JP | 2010-244253 A | 10/2010 |
| JP | 2011-28635 A | 2/2011 |
| JP | 2011-048665 A | 3/2011 |
| JP | 2011-48669 A | 3/2011 |
| JP | 2011-48848 A | 3/2011 |
| WO | 2011/024465 A1 | 3/2011 |
| WO | 2011/024584 A1 | 3/2011 |

OTHER PUBLICATIONS

Office Action mailed Apr. 21, 2015, corresponding to Japanese patent application No. 2013-508953, for which an explanation of relevance is attached.

Office Action mailed Sep. 24, 2014, corresponding to Japanese patent application No. 2013-508953, for which an explanation of relevance is attached.

Office Action mailed Aug. 11, 2015, corresponding to Japanese patent application No. 2013-508953, for which an explanation of relevance is attached.

Office Action mailed Dec. 8, 2015, corresponding to Japanese Patent Application No. 2013-508953, for which an explanation of relevance is attached.

* cited by examiner

| DISPLAY POSITION | INTENSITY | PATTERN |
|---|---|---|
| TOP RIGHT | 3 | ●○○○○○○ |
| RIGHT CENTER | 3 | ●●●●●○○ |
| BOTTOM RIGHT | 3 | ●●●○○○○ |
| TOP CENTER | 5 | ●●●○●○○ |
| CENTER | 5 | ●○●○●○○ |
| BOTTOM CENTER | 5 | ●○●●●○○ |
| TOP LEFT | 3 | ●●●●○○○ |
| LEFT CENTER | 3 | ●●○○○○○ |
| BOTTOM LEFT | 3 | ●●●●●●○ |

9D

| DISTANCE FROM REFERENCE POSITION | INTENSITY | PATTERN |
|---|---|---|
| 0 | 5 | ●○●○●○○ |
| 1 | 3 | ●●●●●○○ |
| 2 | 2 | ●●●○○○○ |
| 3 | 1 | ●○○○○○○ |

9D

ELECTRONIC DEVICE, OPERATION CONTROL METHOD, AND OPERATION CONTROL PROGRAM

CROSS-REFERENCE TO RELATED APPLICATION

This application is a National Stage of PCT international application Ser. No. PCT/JP2012/059583 filed on Apr. 6, 2012 which designates the United States, and which is based upon and claims the benefit of priority from Japanese Patent Application No. 2011-084790 filed on Apr. 6, 2011.

FIELD

The present disclosure relates to an electronic device, an operation control method, and an operation control program.

BACKGROUND

In recent years, electronic devices with a touch panel have widely been used. Such electronic devices accept an input by detecting a contact operation on the touch panel. However, it is hard for users to recognize whether or not the input has been accepted by the contact operation on the touch panel without a visual check on the display.

Known as a technology for letting users recognize the acceptance of an operation input is, for example, a technology for notifying users of the acceptance of an input by a contact operation by generating vibrations (for example, Patent Literature 1).

CITATION LIST

Patent Literature

Patent Literature 1: JP 2002-149312 A

TECHNICAL PROBLEM

However, only with the generation of vibrations, users cannot recognize where on the touch panel a contact operation was performed. The touch panel normally displays various objects such as icons and buttons, and the electronic device changes a function to be executed depending on the fact that a contact operation was detected within a display area of which object. Hence, it is very important for users to recognize a position where the contact operation was performed.

From the foregoing reasons, there is a need for an electronic device, an operation control method, and an operation control program that allows a user to easily recognize an operation position.

SUMMARY

According to an aspect, an electronic device includes: a display unit; a detection unit for detecting contact with the display unit; a vibration unit for vibrating the detection unit; and a control unit for switching between a first state where a predetermined process is not performed based on an operation by contact with the display unit and a second state where the predetermined process is performed based on the operation by contact with the display unit. When the detection unit detects contact at a predetermined position on the display unit in the first state, the control unit causes the vibration unit to vibrate the detection unit based on the contact, and switches from the first state to the second state.

According to another aspect, an operation control method is executed by an electronic device including a display unit, a detection unit for detecting contact with the display unit, and a vibration unit for vibrating the detection unit. The operation control method includes: the detection unit detecting contact with the display unit in a first state where a predetermined process based on an operation by contact with the display unit is not performed; the vibration unit vibrating the display unit based on the contact detected by the detection unit; and upon the detection unit detecting contact at a predetermined position on the detection unit in the first state, switching from the first state to a second state where the predetermined process based on the operation by the contact with the display unit is performed.

According to another aspect, an operation control program causes an electronic device including a display unit, a detection unit for detecting contact with the display unit, and a vibration unit for vibrating the detection unit to execute: the detection unit detecting contact with the display unit in a first state where a predetermined process based on an operation by contact with the display unit is not performed; the vibration unit vibrating the detection unit based on the contact detected by the detection unit; and upon the detection unit detecting contact at a predetermined position on the display unit in the first state, switching from the first state to a second state where the predetermined process based on the operation by the contact with the display unit is performed.

ADVANTAGEOUS EFFECTS OF INVENTION

According to one aspect of the present invention, an electronic device, an operation control method, and an operation control program allowing a user to easily recognize an operation position can be provided.

DESCRIPTION OF EMBODIMENTS

Hereinafter, aspects of the present invention will be described in detail with reference to the drawings. The present invention is not limited by the following description. Moreover, elements in the following description include those that a person skilled in the art can easily conceive, those that are substantially identical thereto, and those in what is called an equivalent scope. A description will be given below, taking a mobile phone as an example of an electronic device. However, a target to which the present invention is applied is not limited to mobile phones, and the present invention can be applied to various devices including touch panels such as PHSs (Personal Handyphone Systems), PDAs, portable navigation devices, personal computers, and gaming devices.

Embodiment

Figure 1:
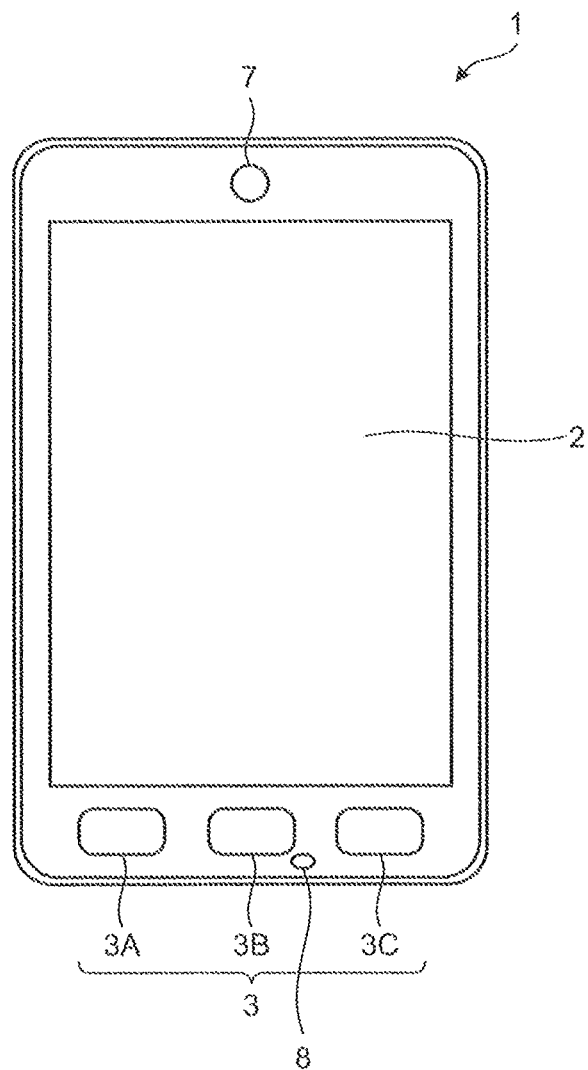
FIG. 1 is a front view illustrating an appearance of a mobile phone.

Firstly, the appearance of a mobile phone 1 being an embodiment of an electronic device according to the present invention will be described with reference to FIG. 1. FIG. 1 is a front view illustrating the appearance of the mobile phone 1. As illustrated in FIG. 1, the mobile phone 1 includes a substantially hexahedral housing that is provided with a touch panel 2, an input unit 3, a speaker 7, and a microphone 8 on its surface.

The touch panel 2 is provided on one of surfaces having the largest area, displays characters, graphics, images and the like, and detects various operations performed on the touch panel 2 using a finger, a stylus, a pen, or the like (hereinafter simply referred to as the "finger"). The method where the touch panel 2 detects various operations may be an arbitrary method such as a capacitive method, a resistive method, or a pressure sensitive method. The input unit 3 includes a plurality of buttons, such as a button 3A, a button 3B, and a button 3C, to which predetermined functions are assigned. The speaker 7 outputs the voice of a person on the other end of line, music reproduced by various programs, sound effects, and the like. The microphone 8 obtains voices during call and at the time of the acceptance of operations by voice.

Figure 2:
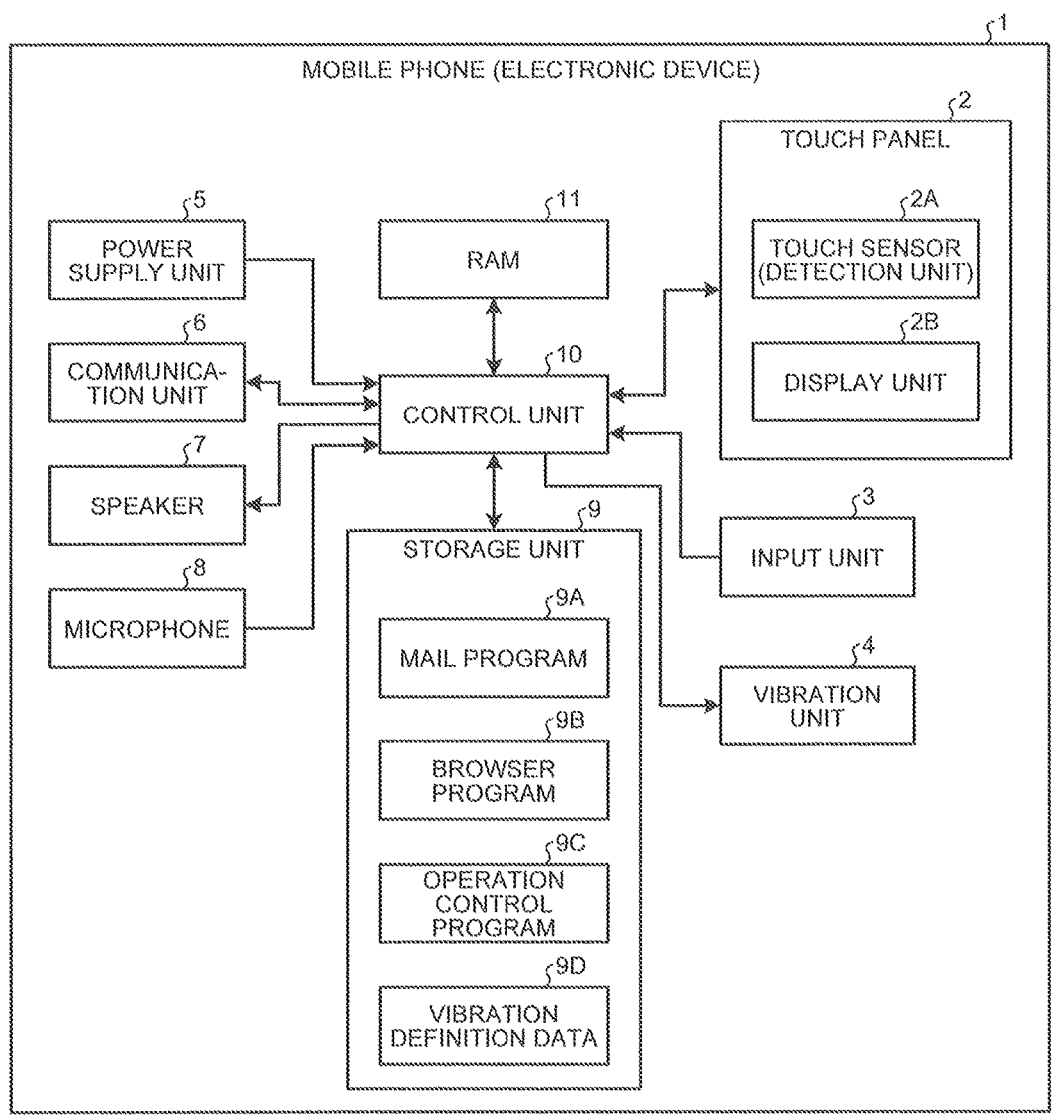
FIG. 2 is a block diagram illustrating a functional configuration of the mobile phone.

Next, the functional configuration of the mobile phone 1 will be described with reference to FIG. 2. FIG. 2 is a block diagram illustrating a functional configuration of the mobile phone 1. As illustrated in FIG. 2, the mobile phone 1 includes the touch panel 2, the input unit 3, a vibration unit 4, a power supply unit 5, a communication unit 6, the speaker 7, the microphone 8, a storage unit 9, a control unit 10, and a RAM (Random Access Memory) 11.

The touch panel 2 includes a display unit 2B, and a touch sensor 2A (a detection unit) that is superimposed on the display unit 2B. The touch sensor 2A detects various operations (operations by contact with the display unit 2B) performed on the touch panel 2 using the finger as well as positions on the touch panel 2 where the operations have been performed, and notifies the operations and positions to the control unit 10. The operations to be detected by the touch sensor 2A include a tap operation and a swipe operation. The tap operation is an operation to move the finger off the touch panel 2 after bringing the finger into contact with the touch panel 2 for a short time. The swipe operation is an operation to move the finger while keeping the finger in contact with the touch panel 2. The display unit 2B is constituted of, for example, a liquid crystal display (LCD, Liquid Crystal Display) or an organic EL (Organic Electro-Luminescence) panel, and displays characters, graphics, and the like.

The input unit 3 accepts the operation of a user through a physical button or the like, and transmits a signal corresponding to the accepted operation to the control unit 10.

The vibration unit 4 generates vibrations using a motor, a piezoelectric element, or the like and accordingly vibrates at least the touch panel 2 directly or indirectly. The vibration unit 4 can change the intensity of vibration in accordance with a signal inputted from the control unit 10. Changing the intensity of vibration may be changing the frequency of vibration, changing the amplitude of vibration, or changing both the frequency and amplitude of vibration.

The power supply unit 5 supplies electric power obtained from a rechargeable battery or an external power supply to the functional units of the mobile phone 1 including the control unit 10. The communication unit 6 establishes a wireless signal path in a CDMA system or the like with a base station via a channel assigned by the base station to perform telephone communication and information communication with the base station. The speaker 7 outputs an audio signal transmitted from the control unit 10 as sound. The microphone 8 converts the voice of a user or the like into an audio signal to output the audio signal to the control unit 10.

The storage unit 9 is a storage device such as a nonvolatile memory or a magnetic storage device. The storage unit 9 stores programs and data that are used for processing by the control unit 10. The programs stored in the storage unit 9 include a mail program 9A, a browser program 9B, and an operation control program 9C. Moreover, the data stored in the storage unit 9 include vibration definition data 9D. The storage unit 9 also stores other programs and data such as an operating system program, which realizes the basic functions of the mobile phone 1, and address book data.

The mail program 9A provides a function of realizing an email function. The browser program 9B provides a function of realizing a web browsing function. The operation control program 9C activates various functions in accordance with input operations detected by the touch panel 2. Moreover, the operation control program 9C provides a function of allowing a user to recognize a contact position. The vibration definition data 9D holds definitions of the intensity and patterns to vibrate the vibration unit 4 in accordance with the functions provided by the operation control program 9C.

The control unit 10 is, for example, a CPU (Central Processing Unit), and integrally controls the operation of the mobile phone 1 to realize various functions. Specifically, the control unit 10 executes instructions included in the programs stored in the storage unit 9 while referring to data stored in the storage unit 9 and data loaded into the RAM 11 as necessary, controls the display unit 2B, the communication unit 6, and the like, and accordingly realizes the various functions.

The programs to be executed by and the data to be referred to by the control unit 10 may be downloaded from a server by wireless communication by the communication unit 6. Alternatively, the programs to be executed by and the data to be referred to by the control unit 10 may be stored in a portable storage medium from which a medium reading apparatus (not illustrated) included in the mobile phone 1 can read information.

The control unit 10 executes, for example, the mail program 9A to realize the email function. Moreover, the control unit 10 executes the browser program 9B to realize the web browsing function. Moreover, the control unit 10 executes the operation control program 9C to realize various functions including the function of allowing a user to recognize a contact position. The control unit 10 is assumed to be capable of executing a plurality of programs concurrently by a multitask function provided by the operating system program.

The RAM 11 is used as a storage area that temporarily stores an instruction of a program to be executed by the control unit 10, data to be referred to by the control unit 10, a computation result of the control unit 10, and the like.

Figure 3:
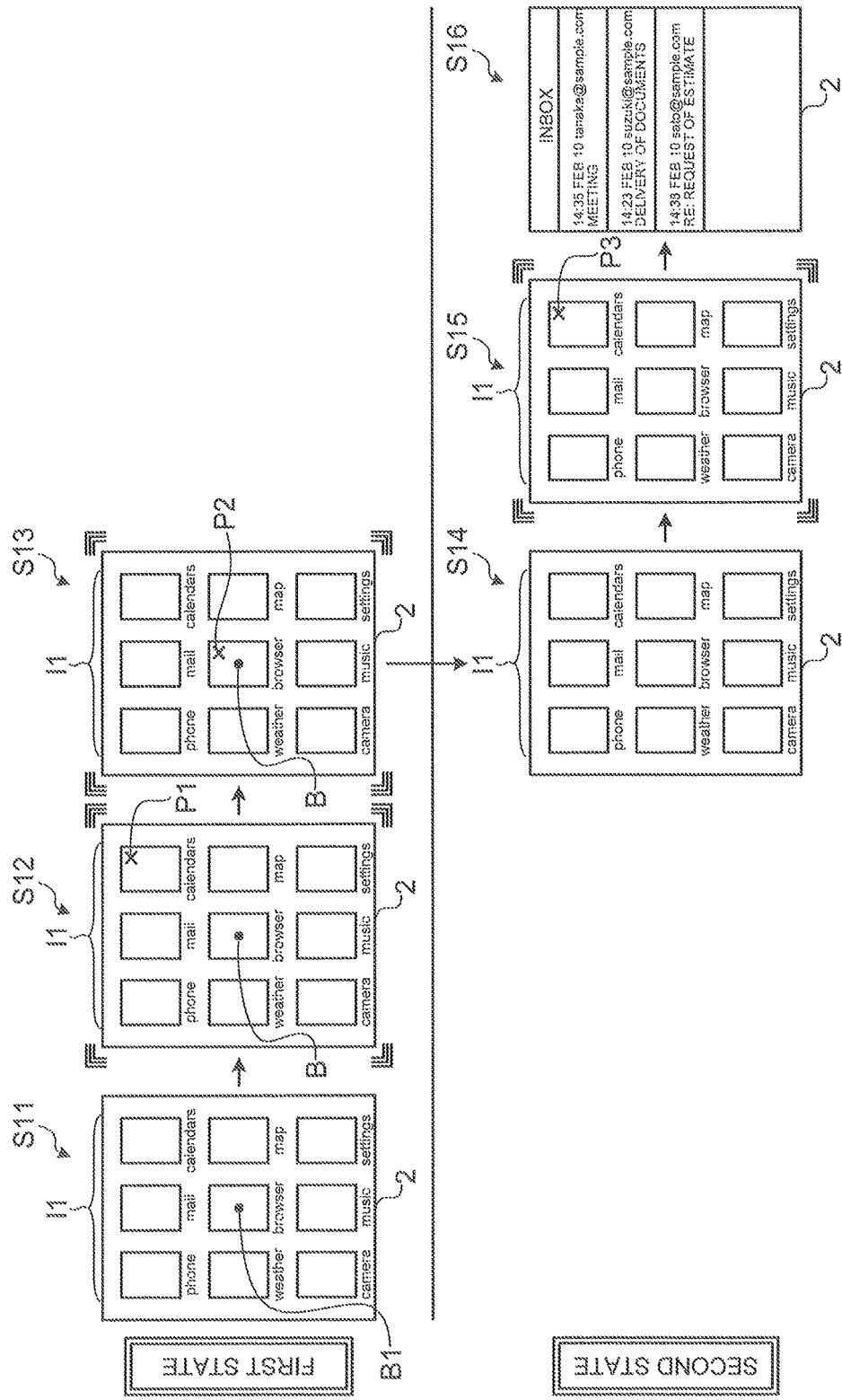
FIG. 3 is a diagram for explaining a function of allowing a user to recognize a contact position.

Next, the function of allowing a user to recognize a contact position will be described with reference to FIG. 3. FIG. 3 is a diagram for explaining the function of allowing a user to recognize a contact position.

As illustrated in FIG. 3, the mobile phone 1 during operation is either in a first state or a second state. The first state is a state to allow a user to recognize a contact position. The second state is a state to execute various processes (predetermined processes) in accordance with the contact operations of the user.

At Step S11 of FIG. 3, the mobile phone 1 is in the first state while display a standard screen on the touch panel 2. The standard screen is a screen in a state of waiting for an activation of various functions such as a call function and an email function. In other words, the standard screen is a screen before switching to a screen corresponding to each type of function provided by the mobile phone 1. The standard screen may also be called, for example, an idle screen, an initial screen, a desktop screen, a home screen, or a wall paper.

In the first state, electric power may be stopped to be supplied to the display unit 2B of the touch panel 2 to turn off the light of the display unit 2B. However, even if the power is stopped to be supplied to the display unit 2B, the power continues to be supplied to the touch sensor 2A, and the touch sensor 2A maintains a state where a contact operation can be detected.

The mobile phone 1 displays a plurality of icons I1 on the standard screen. The icons I1 are image objects respectively associated with specific functions, and are arranged at regular intervals. If the mobile phone 1 is in the second state, when a contact operation within a display area of any of the icons I1 is detected by the touch panel 2, the mobile phone 1 executes a function (the predetermined process) corresponding to the icon I1 where the contact operation was detected.

On the other hand, if the mobile phone 1 is in the first state, the icons I1 are used as a clue to allow the user to recognize a contact position. Specifically, if the mobile phone 1 is in the first state, when a contact operation within a display area of any of the icons I1 is detected by the touch panel 2, the mobile phone 1 causes the vibration unit 4 to vibrate the touch panel 2. The intensity and/or pattern of vibration are changed in accordance with the icon I1 where the contact operation was detected. Hence, the user can recognize on which icon I1 he/she has performed the contact operation based on the intensity and/or pattern of vibration generated in accordance with the contact operation. The predetermined process based on the operation by contact is not performed in the first state. Accordingly, even if the contact operation on the icon I1 is detected, the mobile phone 1 only generates vibrations, and a function corresponding to the icon I1 is not executed.

Moreover, if the mobile phone 1 is in the first state, a reference position B1 is set at a predetermined position on the touch panel 2. The user knows where on the touch panel 2 the reference position B1 is (for example, a center portion on the touch panel 2), and previously remembers a relative position of each object such as the icon I1, with respect to the reference position B1. The mobile phone 1 transits to the second state if a contact operation at a position where the reference position B1 is set or within a display area of the icon I1 including the reference position B1 is detected by the touch panel 2.

In other words, the user finds the reference position B1 based on the intensity and/or pattern of vibration and subsequently performs a contact operation on an arbitrary object based on the known relative position. Thus, the user can activate a function corresponding to the object.

In the example illustrated in FIG. 3, the reference position B1 is provided in the vicinity of the center of the touch panel 2. The vicinity of the center is relatively close to any position on the touch panel 2 and accordingly is suitable as a position where a clue for performing a contact operation on an arbitrary position on the touch panel 2 is set. The position where the reference position B1 is set may be changed by specification by the user, or in accordance with the arrangement of objects such as buttons and icons that accept an input on the screen displayed in the first state.

At Step S12 illustrated in FIG. 3, the user is performing a contact operation at a position P1 on the touch panel 2. The position P1 is included in a display area of the icon I1 displayed on the top right of the touch panel 2. Hence, the mobile phone 1 causes the vibration unit 4 to vibrate in the intensity and pattern corresponding to the icon I1 including the position P1 when the touch panel 2 detects the contact operation at the position P1. The correspondence between an object such as the icon I1 and the intensity and pattern of vibration is defined in the vibration definition data 9D.

Figure 4:
FIG. 4 is a diagram illustrating an example of vibration definition data.

FIG. 4 is a diagram illustrating an example of the vibration definition data 9D. The vibration definition data 9D illustrated in FIG. 4 contains items of a display position, intensity, and a pattern, and data are registered for each object. The display position is a position where an object is displayed. The intensity is the intensity of vibration corresponding to an object, and a lager numeric value indicates a stronger intensity. The pattern is the pattern of vibration corresponding to an object, and combinations of a black round mark(s) representing the generation of vibration for a fixed period of time, and a white round mark(s) representing the suppression of the generation of vibration for a fixed period of time are set.

In the vibration definition data 9D illustrated in FIG. 4, at least one of the intensity and the pattern is different among objects. In this manner, the setting of the vibration definition data 9D enables the user to identify an object targeted for a contact operation based on the intensity and pattern of vibration. The vibration definition data 9D may be preset, or may be set by users individually.

Figure 5:
FIG. 5 is a diagram illustrating another example of the vibration definition data.

FIG. 5 is a diagram illustrating another example of the vibration definition data 9D. The vibration definition data 9D illustrated in FIG. 5 contains items of a distance from a reference position, intensity, and a pattern, and data is registered for each distance from the reference position. The distance from the reference position is a value indicating a distance of an object from the reference position B1. The distance from the reference position is set to zero when the reference position B1 exists within a display area of the object, and becomes a larger value as the object is located farther from the reference position B1. The intensity is the intensity of vibration corresponding to an object. The pattern is the pattern of vibration corresponding to an object.

The vibration definition data 9D illustrated in FIG. 5 is set such that as an object is located farther from the reference position B1, the intensity of vibration becomes weaker and the duration of vibration becomes shorter in one pattern. In this manner, the intensity and pattern of vibration are changed in accordance with a distance from the reference position B1 pursuant to a specific law, and accordingly the user can find the reference position B1 even if not remembering the intensity and/or patterns of vibration corresponding to the objects.

At Step S13, the user roughly finds the reference position B1 based on the intensity and pattern of vibration of the touch panel 2, and performs a contact operation at a position P2 in the vicinity of the reference position B1. The position P2 is included in a display area of the icon I1 displayed in the center of the touch panel 2, and the reference position B1 exists within the same display area. In this manner, when the touch panel 2 detects the contact operation within the same display area as the reference position B1, the mobile phone 1 causes the vibration unit 4 to vibrate in the intensity and pattern corresponding to the icon I1 displayed in the area and then transits to the second state at Step S14.

At this point, the user can know that he/she has performed the contact operation on the icon I1 including the reference position B1 and that the mobile phone 1 consequently transits to the second state. Moreover, the user can estimate the locations of the icons I1 substantially correctly, even without a visual check, from the knowledge on the relative positions between the reference position B1 and the icons I1, and the sensed intensity and pattern of vibration.

Upon switching from the first state to the second state, it is preferred that the intensity and pattern of vibration to be generated be made clearly different from those in other situation so as to ensure the user to recognize the transition of the state. Moreover, another notification means such as an output of a notification sound from the speaker 7 may be used in combination to ensure the user to recognize the transition of the state.

At Step S15 illustrated in FIG. 3, the user is performing a contact operation at a position P3 on the touch panel 2. The position P3 is included in the display area of the icon I1 displayed on the top right of the touch panel 2 similarly to the position P1. The mobile phone 1 has transited to the second state and accordingly executes a function associated to the icon I1 including the position P3 when the touch panel 2 detects the contact operation at the position P3. At this point, the mobile phone 1 causes the vibration unit 4 to generate vibrations to indicate that the function has been executed. The intensity and pattern of vibration at this point may be the same as or different from the case where the contact operation at the position P3 was detected in the first state.

For example, the function associated with the icon I1 including the position P3 is assumed to be a function of displaying the list of incoming mails. In this case, the mobile phone 1 displays an inbox screen on the touch panel 2 in accordance with the contact operation at the position P3 as in Step S16.

In this manner, the mobile phone 1 allows the user to recognize a contact position of a contact operation by falling in the first state other than the second state of activating a function associated with an object displayed on the touch panel 2 in accordance with the contact operation on the object. In other words, the mobile phone 1 is configured to allow the user to recognize a contact position and easily activate a desired function.

The icon I1 including the reference position B1 is treated, in the first state, as a special area for the transition from the first state to the second state, but is treated similarly to the other icons I1 in the second state. In other words, the icon I1 including the reference position B1 is used as an area for activating its associated function in the second state. The mobile phone 1 may generate vibrations only for a contact operation on the icon I1 including the reference position B1 among the icons I1 displayed on the touch panel, and not generate vibrations for contact operations on the other icons I1.

Figure 6:
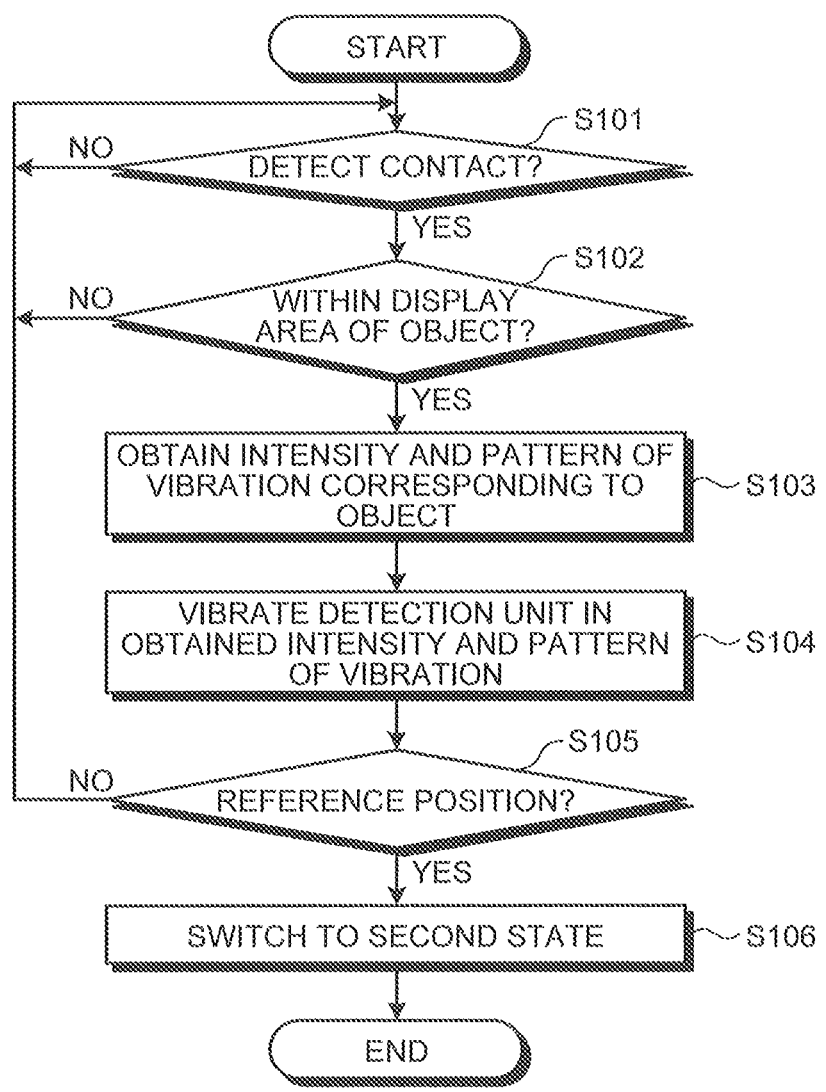
FIG. 6 is a flowchart illustrating a processing procedure of contact operation control in a first state.
Figure 7:
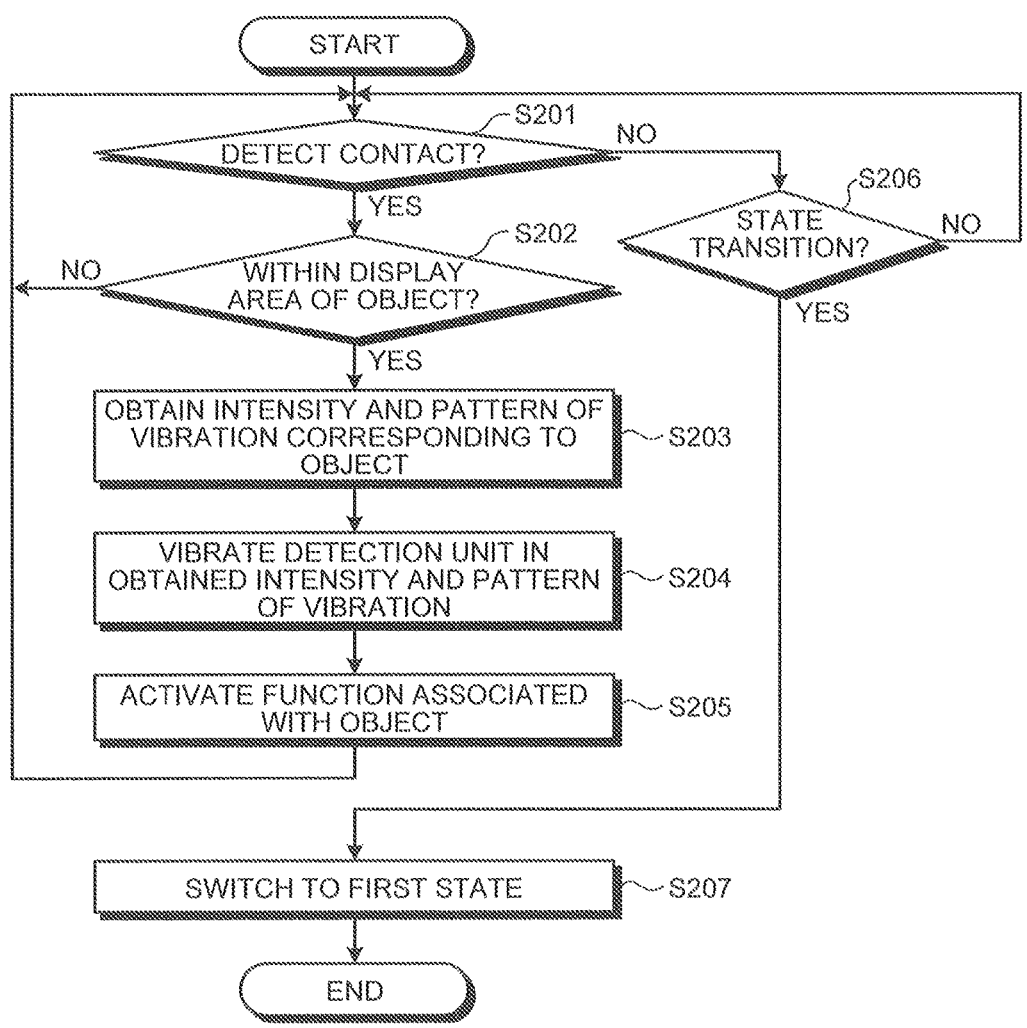
FIG. 7 is a flowchart illustrating a processing procedure of contact operation control in a second state.

Next, a processing procedure of control to be executed by the mobile phone 1 in the first and second states will be described with reference to FIGS. 6 and 7. FIG. 6 is a flowchart illustrating a processing procedure of contact operation control in the first state. FIG. 7 is a flowchart illustrating a processing procedure of contact operation control in the second state. The control unit 10 executes the operation control program 9C and accordingly the processing procedures illustrated in FIGS. 6 and 7 are realized.

As illustrated in FIG. 6, when the mobile phone 1 is in the first state, the control unit 10 determines at Step S101 whether or not a contact operation on the display unit 2B has been detected. If a contact operation has not been detected (Step S101, No), the control unit 10 reexecutes the determination of Step S101.

If a contact operation has been detected (Step S101, Yes), the control unit 10 determines at Step S102 whether or not a position where the contact operation was performed is within a display area of an object such as an icon. If the position where the contact operation was performed is not within a display area of an object (Step S102, No), the control unit 10 reexecutes Step S101 and onwards.

If the position where the contact operation was performed is within a display area of an object (Step S102, Yes), the control unit 10 obtains the intensity and pattern of vibration corresponding to the object from the vibration definition data 9D at Step S103. The control unit 10 then causes the vibration unit 4 to vibrate the touch sensor 2A in the obtained intensity and pattern at Step S104.

Subsequently, the control unit 10 determines at Step S105 whether or not the reference position B1 is within the display area of the object on which the contact operation was performed. If the reference position B1 is not present (Step S105, No), the control unit 10 reexecutes Step S101 and onwards. On the other hand, if the reference position B1 is present (Step S105, Yes), the control unit 10 switches the mobile phone 1 to the second state at Step S106.

As illustrated in FIG. 7, when the mobile phone 1 is in the second state, the control unit 10 determines at Step S201 whether or not a contact operation on the display unit 2B has been detected. If a contact operation has been detected (Step S201, Yes), the control unit 10 determines at Step S202 whether or not a position where the contact operation was performed is within a display area of an object such as an icon. If the position where the contact operation was performed is not within a display area of an object (Step S202, No), the control unit 10 reexecutes Step S201 and onwards.

If the position where the contact operation was performed is within a display area of an object (Step S202, Yes), the control unit 10 obtains the intensity and pattern of vibration corresponding to the object from the vibration definition data 9D at Step S203. The control unit 10 then causes the vibration unit 4 to vibrate the touch sensor 2A in the obtained intensity and pattern at Step S204. Moreover, the control unit 10 activates a function associated with the object at Step S205. The control unit 10 then reexecutes Step S201 and onwards.

If a contact operation has not been detected at Step S201 (Step S201, No), the control unit 10 determines at Step S206 whether to perform a state transition to the first state. The state transition to the first state is performed, for example, if a contact operation has not been detected for a predetermined period of time or more, or if a predetermined operation has been detected in the input unit 3. If the state transition is not performed (Step S206, No), the control unit 10 reexecutes Step S201 and onwards. On the other hand, if the state transition is performed (Step S206, Yes), the control unit 10 switches the mobile phone 1 to the first state at Step S207.

As described above, the mobile phone 1 according to the embodiment is configured to vibrate the touch panel 2 in the intensity and/or pattern in accordance with a contact position when accepting a contact operation in the first state, and thus allows a user to recognize the contact position.

The aspect of the present invention described in the embodiment can be modified arbitrarily within a scope of not departing from the gist of the present invention. For example, in the embodiment, the example has been described in which the present invention is applied to the electronic device including the touch panel 2 as display means. However, the present invention can also be applied to an electronic device where the touch sensor 2A is not superimposed on the display unit 2B. In this case, the present invention is used to allow a user to recognize where on the touch sensor 2A he/she is performing a contact operation.

In the embodiment, if a position where a contact operation was performed in the second state is within a display area of an object, the control unit 10 activates a function associated with the object. However, with regard to an object having a reference position, if a position where a contact operation was performed in the first state is within a display area of the object, the present invention may vibrate the touch panel 2 in the intensity and pattern of vibration corresponding to the object and activate a function associated with the object.

A reference position of the present invention may be set as a center position of the touch panel 2 (the touch sensor 2A).

In the embodiment, the standard screen is assumed to be displayed on the touch panel 2 in the first state. However, a screen to be displayed in the first state is not limited to the standard screen. If a screen other than the standard screen is displayed on the touch panel 2 in the first state, when a contact operation on an object such as a button to which some function is assigned is detected, vibrations may be generated in accordance with the object. Moreover, the intensity and/or pattern of vibration may be set for each screen.

For example, if a virtual keyboard is displayed on the touch panel 2 in the first state, when a contact operation on a button on the virtual keyboard is detected, vibrations may be generated in accordance with the button. An example where a virtual keyboard is being displayed will be described with reference to FIGS. 10 and 11.

Figure 10:
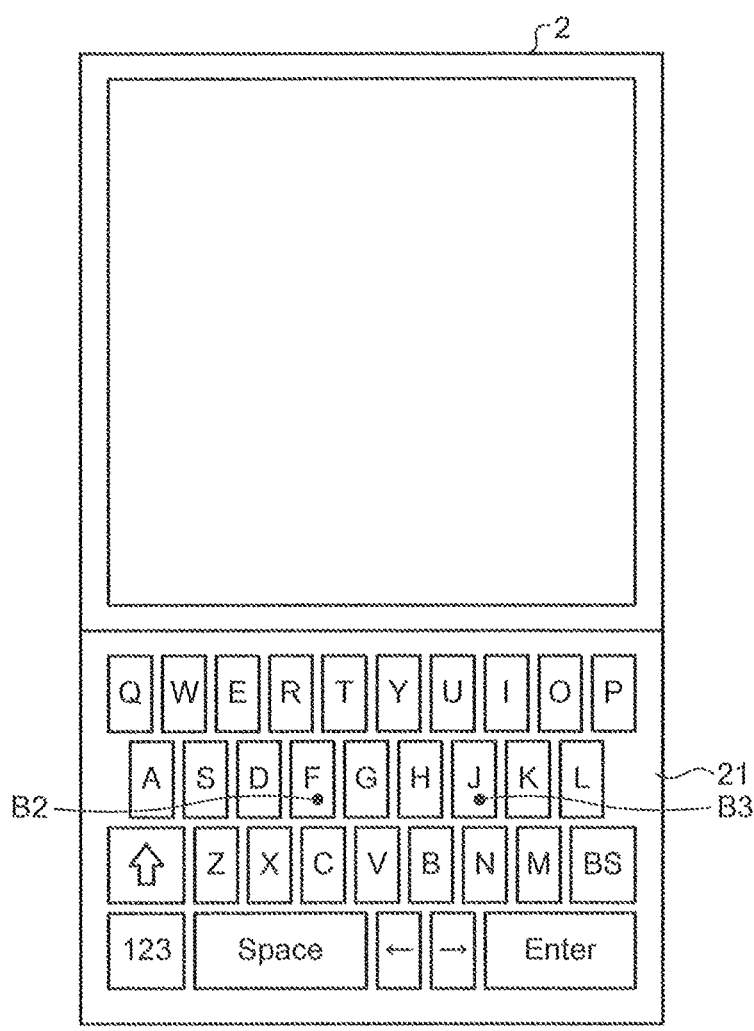
FIG. 10 is a diagram illustrating an example where a virtual QWERTY keyboard is being displayed on a touch panel.

FIG. 10 is a diagram illustrating an example where a virtual QWERTY keyboard 21 is being displayed on the touch panel 2. In this manner, if the virtual QWERTY keyboard 21 is being displayed, when contact operations on buttons corresponding to characters such as "A" and "B" and buttons corresponding to function keys such as "BS" are detected in the first state, vibrations may be generated in accordance with the buttons. Moreover, if the virtual QWERTY keyboard 21 is being displayed, it is preferred to provide reference positions in display areas of buttons corresponding to home positions of the index fingers as in providing a reference position B2 in a display area of a button corresponding to "F" and a reference position B3 in a display area of a button corresponding to "J." Reference positions are provided within a display area of buttons corresponding to home positions of the index fingers and accordingly it becomes easy to grasp a position of another button after the transition to the second state. In this case, if it is determined that contact operations were simultaneously performed at a position within the display area of the button corresponding to "F" and a position within the display area of the button corresponding to "J," the transition may be made to the second state.

Figure 11:
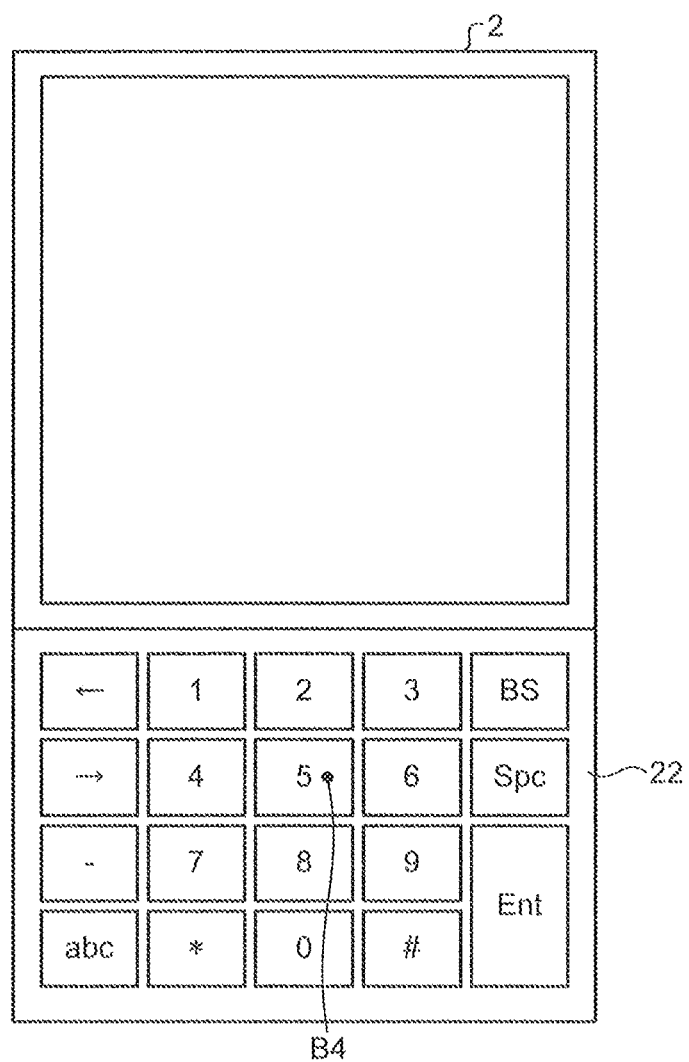
FIG. 11 is a diagram illustrating an example where a virtual numeric keyboard is being displayed on the touch panel.

FIG. 11 is a diagram illustrating an example where a virtual numeric keyboard 22 is being displayed on the touch panel 2. In this manner, if the virtual numeric keyboard 22 is being displayed, when contact operations on buttons corresponding to numerals such as "1" and "2" and buttons corresponding to the function keys such as "BS" are detected in the first state, vibrations may be generated in accordance with the buttons. Moreover, if the virtual numeric keyboard 22 is being displayed, it is preferred to provide a reference position B4 within a display area of a button corresponding to "5" arranged at the center of buttons corresponding to the numerals. When the reference position B4 is provided within a display area of a button arranged at the center such as the button corresponding to "5," it becomes easy to grasp positions of the other buttons after the transition to the second state. For convenience of illustration, the reference positions B2, B3, and B4 are not located at the centers of the display areas of the buttons in FIGS. 10 and 11. However, these reference positions are preferable to be located at the centers of the display areas of the buttons.

In the embodiment, the intensity and/or pattern of vibration are changed, depending on the object, in the first state. However, regardless of the area in which a contact position is included, the intensity and/or pattern of vibration may be changed depending on a distance and direction from a contact position to a reference position. In this case, if a contact operation is detected within a predetermined distance from the reference position, the transition may be made to the second state.

Figure 8:
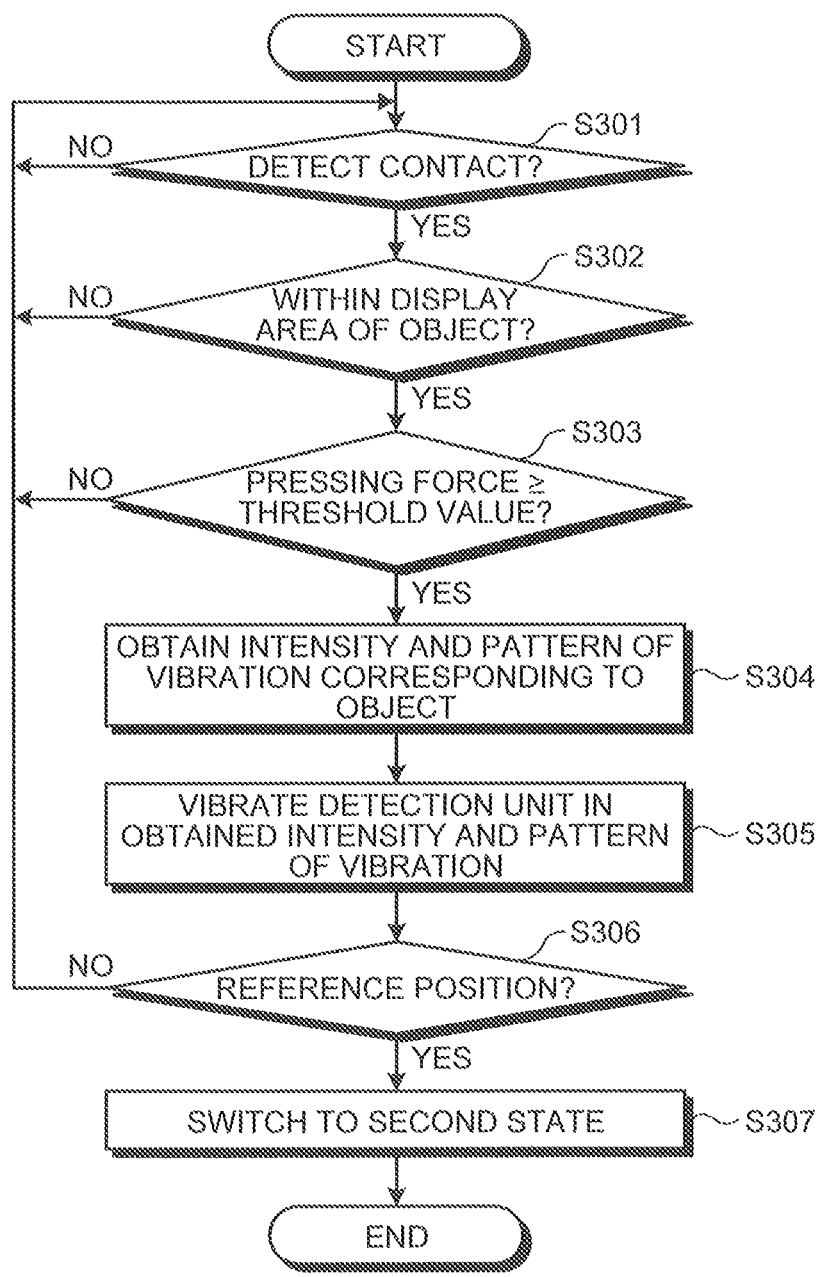
FIG. 8 is a flowchart illustrating a modification of the processing procedure of the contact operation control in the first state.

If a piezoelectric element, a strain gauge sensor, or the like is arranged at on the touch panel 2 and accordingly a pressing force (press) of a contact operation on the touch panel 2 can be detected (if the touch panel 2 (the detection unit) can detect a pressing force), even when the contact operation is detected in the first state, it may be set such that vibrations are not generated as long as the pressing force of the contact operation (data values such as a voltage value and a resistance value based on the press) is smaller than a threshold value. The operations in this case will be described with reference to FIG. 8. FIG. 8 is a flowchart illustrating a modification of the processing procedure of the contact operation control in the first state.

As illustrated in FIG. 8, when the mobile phone 1 is in the first state, the control unit 10 determines at Step S301 whether or not a contact operation on the display unit 2B has been detected. If a contact operation has not been detected (Step S301, No), the control unit 10 reexecutes the determination of Step S301.

If a contact operation has been detected (Step S301, Yes), the control unit 10 determines at Step S302 whether or not a position where the contact operation was performed is within a display area of an object such as an icon. If the position where the contact operation was performed is not within a display area of an object (Step S302, No), the control unit 10 reexecutes Step S301 and onwards.

If the position where the contact operation was performed is within a display area of an object (Step S302, Yes), the control unit 10 determines at Step S303 whether or not a pressing force of the contact operation is equal to or more than a threshold value. If the pressing force of the contact operation is not equal to or more than the threshold value (Step S303, No), the control unit 10 reexecutes Step S301 and onwards.

If the pressing force of the contact operation is equal to or more than the threshold value (Step S303, Yes), the control unit 10 obtains the intensity and pattern of vibration corresponding to the object from the vibration definition data 9D at Step S304. The control unit 10 then causes the vibration unit 4 to vibrate the touch sensor 2A in the obtained intensity and pattern at Step S305.

Subsequently, the control unit 10 determines at Step S306 whether or not the reference position B1 is within the display area of the object where the contact operation was performed. If the reference position B1 is not present (Step S306, No), the control unit 10 reexecutes Step S301 and onwards. On the other hand, if the reference position B1 is present (Step S306, Yes), the control unit 10 switches the mobile phone 1 to the second state at Step S307.

In this manner, a pressing force of a contact operation is added to the conditions, and accordingly the mobile phone 1 can be prevented from transiting from the first state to the second state due to unexpected contact.

Figure 9:
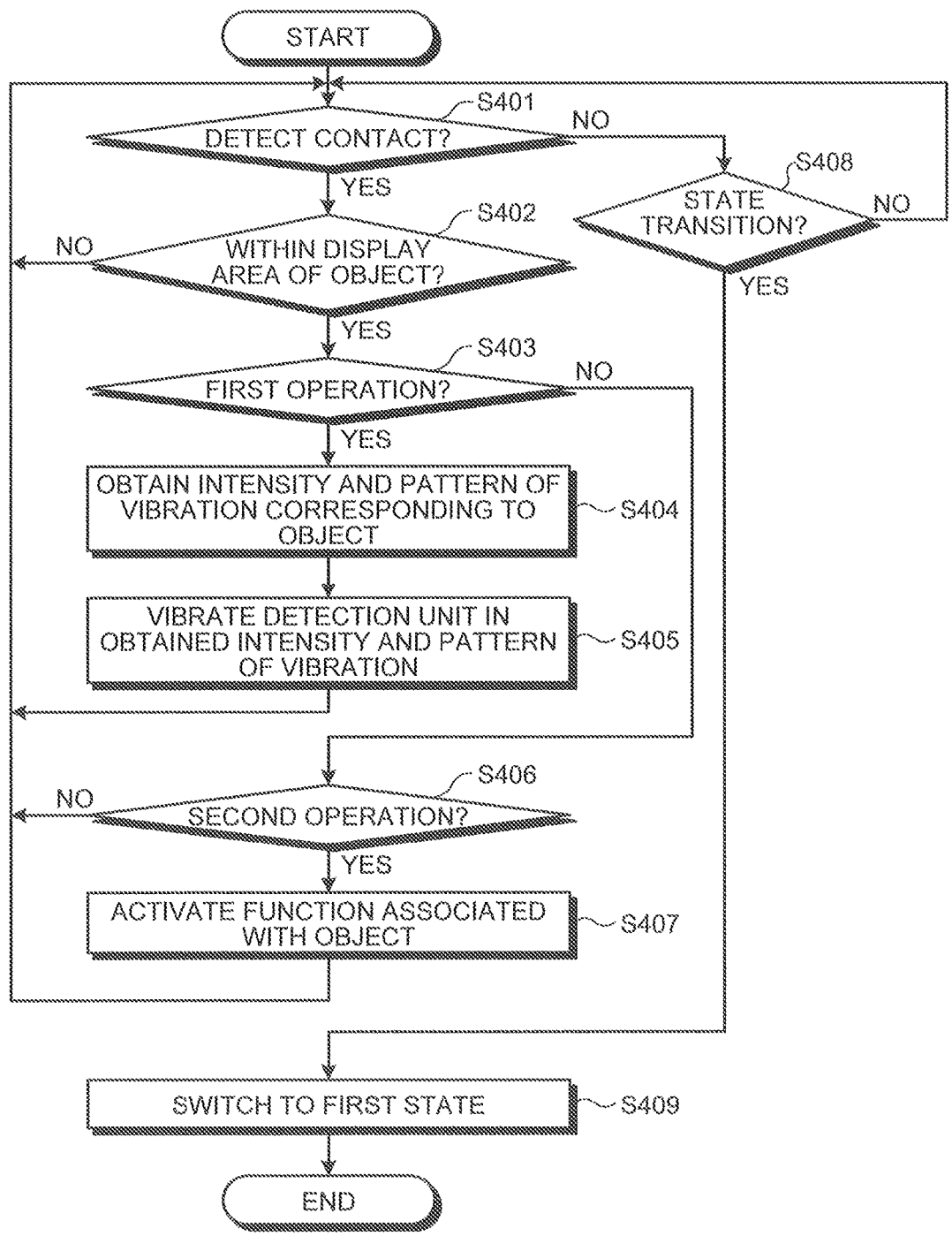
FIG. 9 is a flowchart illustrating a modification of the processing procedure of the contact operation control in the second state.

It may be configured to enable a user to check where a contact position is and subsequently activate a function in accordance with the contact position. The operations in this case will be described with reference to FIG. 9. FIG. 9 is a flowchart illustrating a modification of the processing procedure of the contact operation control in the second state.

As illustrated in FIG. 9, When the mobile phone 1 is in the second state, the control unit 10 determines at Step S401 whether or not a contact operation on the display unit 2B has been detected. If a contact operation has been detected (Step S401, Yes), the control unit 10 determines at Step S402 whether or not a position where the contact operation was performed is within a display area of an object such as an icon. If the position where the contact operation was performed is not within a display area of an object (Step S402, No), the control unit 10 reexecutes Step S401 and onwards.

If the position where the contact operation was performed is within a display area of an object (Step S402, Yes), the control unit 10 determines at Step S403 whether or not the detected contact operation is a first operation. The first operation is an operation to be performed to check the contact position. The first operation is, for example, a single tap operation where a tap operation is performed once within a predetermined period of time.

If the detected contact operation is the first operation (Step S403, Yes), the control unit 10 obtains the intensity and pattern of vibration corresponding to an object including the contact position from the vibration definition data 9D at Step S404. The control unit 10 then causes the vibration unit 4 to vibrate the touch sensor 2A in the obtained intensity and pattern at Step S405. The control unit 10 then reexecutes Step S401 and onwards.

If the detected contact operation is not the first operation (Step S403, No), the control unit 10 determines at Step S406 whether or not the detected contact operation is a second operation. The second operation is an operation to be performed to activate a function corresponding to the contact position. The second operation is, for example, a double tap operation where a tap operation is performed twice within a predetermined period of time.

If the detected contact operation is the second operation (Step S406, Yes), the control unit 10 activates a function associated to an object including the contact position at Step S407. The control unit 10 then reexecutes Step S401 and onwards. If the detected contact operation is not the second operation (Step S406, No), the control unit 10 reexecutes Step S401 and onwards without activating any function.

If a contact operation has not been detected at Step S401 (Step S401, No), the control unit 10 determines at Step S408 whether or not the state transition to the first state is performed. If the state transition is not performed (Step S408, No), the control unit 10 reexecutes Step S401 and onwards. On the other hand, if the state transition is performed (Step S408, Yes), the control unit 10 switches the mobile phone 1 to the first state at Step S409.

In this manner, an operation to generate vibrations and an operation to activate a function are distinguished in the second state, which enables a user to check a contact position before activating a function and consequently a misoperation hardly happens. A combination of the first operation and the second operation in the above description is an example. The first operation may be, for example, a long tap (long press) operation to bring the finger into contact with the touch panel 2 for a fixed period of time or more, and the second operation may be a single tap operation. Alternatively, the first operation may be an operation to bring the finger into contact with the touch panel 2, and the second operation may be an operation to press the touch panel with a pressing force equal to or more than a predetermined threshold value.

The invention claimed is:

1. An electronic device, comprising:
   a display unit; and
   a controller for switching between (i) a first state where a predetermined process is not performed based on contact with the display unit and (ii) a second state where the predetermined process is performed based on contact with the display unit,
   wherein
   in the first state,
      in response to a detection of a first contact outside a display area of a reference position on the display unit, the controller is configured only to vibrate the display unit according to the first contact; and
      in response to a detection of (i) a second contact, being different from the first contact and following the first contact, within the display area of the reference position on the display unit and (ii) a pressing force of the second contact with the display unit being equal to or greater than a predetermined threshold value, the controller is configured to
         vibrate the display unit according to the second contact to inform a user of the electronic device about a setting of the reference position for contact on the display unit, and then
         switch from the first state to the second state, and
   in the second state,
      in response to a detection of a third contact, being different from the second contact and following the second contact, with the display unit,
         the controller is configured to perform the predetermined process and vibrate the display unit again in response to said third contact to inform the user that the predetermined process is performed.

2. The electronic device according to claim 1, wherein the second contact follows a release of the first contact from the display unit.

3. An operation control method to be executed by an electronic device including a display unit, the operation control method comprising:
   in a first state where a predetermined process is not performed based on contact with the display unit, in response to a detection of a first contact outside a display area of a reference position on the display unit, only vibrating the display unit according to the first contact; and in response to a detection of (i) a second contact, being different from the first contact and following the first contact, within the display area of the reference position on the display unit and (ii) a pressing force of the second contact with the display unit being equal to or greater than a predetermined threshold value, vibrating the display unit according to the second contact to inform a user of the electronic device about a setting of the reference position for contact on the display unit, and then switching from the first state to a second state where the predetermined process based on contact with the display unit is performed, and in the second state, in response to a detection of a third contact, being different from the second contact and following the second contact, with the display unit, performing the predetermined process and vibrating the display unit again in response to said third contact to inform the user that the predetermined process is performed.

4. The operation control method according to claim 3, wherein the second contact follows a release of the first contact from the display unit.

5. A non-transitory computer-readable medium comprising an operation control program configured to cause, when executed by an electronic device including a display unit, the electronic device to execute:

in a first state where a predetermined process is not performed based on contact with the display unit, in response to a detection of a first contact outside a display area of a reference position on the display unit, only vibrating the display unit according to the first contact; and in response to a detection of (i) a second contact, being different from the first contact and following the first contact, within the display area of the reference position on the display unit and (ii) a pressing force of the second contact with the display unit being equal to or greater than a predetermined threshold value, vibrating the display unit according to the second contact to inform a user of the electronic device about a setting of a reference position for contact on the display unit, and then switching from the first state to a second state where the predetermined process based on contact with the display unit is performed, and in the second state, in response to a detection of a third contact, being different from the second contact and following the second contact, with the display unit, performing the predetermined process and vibrating the display unit again in response to said third contact to inform the user that the predetermined process is performed.

6. The non-transitory computer-readable medium according to claim 5, wherein the second contact follows a release of the first contact from the display unit.

7. An electronic device, comprising:
a display unit;
a touch sensor; and a controller for switching between (i) a first state where a predetermined process is not performed based on contact with the touch sensor and (ii) a second state where the predetermined process is performed based on contact with the touch sensor, wherein in the first state, in response to a detection of a first contact, with the touch sensor, outside a display area of a reference position on the display unit, the controller is configured only to vibrate the display unit according to the first contact; and in response to a detection of (i) a second contact, with the touch sensor, within the display area of the reference position on the display unit and (ii) a pressing force of the second contact being equal to or greater than a predetermined threshold value, the second contact being different from the first contact and following the first contact, the controller is configured to
vibrate the display unit according to the second contact to inform a user of the electronic device about a setting of the reference position for contact on the touch sensor, and then
switch from the first state to the second state, and in the second state,
in response to a detection of a third contact with the touch sensor, said third contact being different from the second contact and following the second contact,
the controller is configured to perform the predetermined process and vibrate the display unit again in response to said third contact to inform the user that the predetermined process is performed.

8. The electronic device according to claim 7, wherein the second contact follows a release of the first contact from the display unit.

9. An operation control method to be executed by an electronic device including a display unit and a touch sensor, the operation control method comprising:

in a first state where a predetermined process is not performed based on contact with the touch sensor, in response to a detection of a first contact, with the touch sensor, outside a display area of a reference position on the display unit, only vibrating the display unit according to the first contact; and in response to a detection of (i) a second contact, with the touch sensor, within the display area of the reference position on the display unit and (ii) a pressing force of the second contact being equal to or greater than a predetermined threshold value, the second contact being different from the first contact and following the first contact, vibrating the display unit according to the second contact to inform a user of the electronic device about a setting of the reference position for contact on the touch sensor, and then
switching from the first state to a second state where the predetermined process based on contact with the touch sensor is performed, and in the second state,
in response to a detection of a third contact with the touch sensor, said third contact being different from the second contact and following the second contact,
performing the predetermined process and vibrating the display unit again in response to said third contact to inform the user that the predetermined process is performed.

10. The operation control method according to claim 9, wherein the second contact follows a release of the first contact from the display unit.

11. A non-transitory computer-readable medium comprising an operation control program configured to cause, when executed by an electronic device including a display unit and a touch sensor, the electronic device to execute:
  in a first state where a predetermined process is not performed based on contact with the touch sensor,
    in response to a detection of a first contact, with the touch sensor, outside a display area of a reference position on the display unit, only vibrating the display unit according to the first contact; and
    in response to a detection of (i) a second contact, with the touch sensor, within the display area of the reference position on the display unit and (ii) a pressing force of the second contact being equal to or greater than a predetermined threshold value, the second contact being different from the first contact and following the first contact,
      vibrating the display unit according to the second contact to inform a user of the electronic device about a setting of the reference position for contact on the touch sensor, and then
      switching from the first state to a second state where the predetermined process based on contact with the touch sensor is performed, and
  in the second state,
    in response to a detection of a third contact with the touch sensor, said third contact being different from the second contact and following the second contact,
      performing the predetermined process and vibrating the display unit again in response to said third contact to inform the user that the predetermined process is performed.

12. The non-transitory computer-readable medium according to claim 11, wherein the second contact follows a release of the first contact from the display unit.

\* \* \* \* \*